(12) United States Patent
Subramanian et al.

(10) Patent No.: US 12,444,452 B2
(45) Date of Patent: Oct. 14, 2025

(54) MEMORY PHYSICAL LAYER INTERFACE, MEMORY APPARATUS AND METHOD THEREOF

(71) Applicant: Faraday Technology Corp., Hsinchu (TW)

(72) Inventors: Sivaramakrishnan Subramanian, Bengaluru (IN); Hussainvali Shaik, Bangalore (IN); Eswar Reddi, Bangalore (IN)

(73) Assignee: Faraday Technology Corp., Hsinchu (TW)

( * ) Notice: Subject to any disclaimer, the term of this patent is extended or adjusted under 35 U.S.C. 154(b) by 239 days.

(21) Appl. No.: 18/509,318

(22) Filed: Nov. 15, 2023

(65) Prior Publication Data

US 2025/0157515 A1    May 15, 2025

(51) Int. Cl.
| | |
|---|---|
| *G11C 8/18* | (2006.01) |
| *G11C 7/10* | (2006.01) |
| *G11C 7/20* | (2006.01) |
| *G11C 7/22* | (2006.01) |

(52) U.S. Cl.
CPC .............. *G11C 8/18* (2013.01); *G11C 7/1069* (2013.01); *G11C 7/20* (2013.01); *G11C 7/222* (2013.01)

(58) Field of Classification Search
CPC ........... G11C 8/18; G11C 7/1069; G11C 7/20; G11C 7/222; G11C 16/105; G11C 16/06
USPC ....................................................... 365/233.1
See application file for complete search history.

(56) References Cited

U.S. PATENT DOCUMENTS

| | | |
|---|---|---|
| 11,417,374 B1 | 8/2022 | Waldrop et al. |
| 2023/0088490 A1* | 3/2023 | Lee ............ G11C 7/1057 365/191 |

FOREIGN PATENT DOCUMENTS

| | | |
|---|---|---|
| CN | 109976665 | 7/2019 |
| CN | 113364713 | 9/2021 |
| CN | 114464220 | 5/2022 |
| CN | 114974354 | 8/2022 |
| CN | 115116503 | 9/2022 |
| TW | 202201933 | 1/2022 |

OTHER PUBLICATIONS

"Office Action of Taiwan Counterpart Application", issued on Dec. 23, 2024, p. 1-p. 12.

* cited by examiner

*Primary Examiner* — Huan Hoang
(74) *Attorney, Agent, or Firm* — JCIPRNET

(57) ABSTRACT

A memory apparatus includes a DFE receiver and a DFE reset circuit. The DFE receiver is configured to receive a data signal and a data strobe signal from a memory device. The DFE receiver includes a DFE tap that is determined according to a previous data signal, and the DFE receiver adjusts the data signal according to the DFE tap. The DFE reset circuit is configured to receive a gate enable signal and an internal enable signal from the memory controller, generate a DFE reset signal according to the gate enable signal and the internal enable signal. The DFE reset circuit outputs the DFE reset signal to the DFE receiver to reset the DFE tap of the DFE receiver between read bursts.

20 Claims, 5 Drawing Sheets

MEMORY PHYSICAL LAYER INTERFACE, MEMORY APPARATUS AND METHOD THEREOF

BACKGROUND

Technical Field

The disclosure generally relates to a memory apparatus, and more particularly related to resetting decision feedback equalization (DFE) tap of DFE receiver in the memory apparatus.

Description of Related Art

A memory apparatus, such as a double data rate dynamic random-access memory (DDR RAM) is used widely in many applications for storing data. Some memory apparatuses use a DFE receiver to meet requirements of high speed and low power consumption. The DFE receiver may include a DFE tap that should be reset before a read burst is performed. However, resetting the DFE tap is a big concern for DDR applications, because a gap between two read bursts varies and it is very difficult to meet timing to reset the tap across different frequencies.

It is desirable for a novel design of the memory apparatus that is capable of effectively resetting the DFE tap of the memory apparatus.

SUMMARY

The disclosure introduces a memory apparatus, a memory physical layer interface and a method thereof that are capable of resetting DFE tap between read bursts across different frequencies.

In some embodiments, the memory apparatus includes a memory device, a memory controller and a memory physical layer interface that is coupled between the memory device and the memory controller. The memory physical layer interface includes a DFE receiver and a DFE reset circuit. The DFE receiver is configured to receive a data signal and a data strobe signal from the memory device. The DFE receiver includes a DFE tap that is determined according to a previous data signal, and the DFE receiver adjusts the data signal according to the DFE tap. The DFE reset circuit is configured to receive a gate enable signal and an internal enable signal from the memory controller, generate a DFE reset signal according to the gate enable signal and the internal enable signal, and output the DFE reset signal to the DFE receiver to reset the DFE tap of the DFE receiver between read bursts.

In some embodiments, a memory physical layer interface includes a DFE receiver and a DFE reset circuit. The DFE receiver receives a data signal and a data strobe signal. The DFE receiver includes a DFE tap that is determined according to a previous data signal, and the DFE receiver adjusts the data signal according to the DFE tap. The DFE reset circuit is configured to receive a gate enable signal and an internal enable signal, generate a DFE reset signal according to the gate enable signal and the internal enable signal and output the DFE reset signal to the DFE receiver to reset the DFE tap of the DFE receiver between read bursts.

In some embodiments, a method of a memory apparatus comprising a memory device, a memory controller and a memory physical layer interface, wherein the memory physical layer interface includes a DFE reset circuit and a DFE receiver. The method includes steps receiving, by the DFE reset circuit, a gate enable signal and an internal enable signal from the memory controller; generating, by the DFE reset circuit, a DFE reset signal according to the gate enable signal (Gate_EN) and the internal enable signal (IE); and outputting, the DFE reset signal, to the DFE receiver to reset a DFE tap of the DFE receiver between read bursts.

In the above embodiments, a memory apparatus may include a DFE reset circuit and a DFE receiver. The DFE reset circuit may generate a DFE reset signal based on a gate enable signal and an internal enable signal, and the DFE reset circuit may provide the generated DFE reset signal to the DFE receiver to reset a DFE tap of the DFE receiver between read bursts. Since the DFE reset signal is generated based on both the gate enable signal and the internal enable signal, the DFE reset signal can reset the DFE tap between read bursts across all frequencies. Furthermore, the memory apparatus may include an AND gate that receives the gate enable signal and the data strobe signal and the memory apparatus may route the DFE reset signal with similar delay of the data strobe signal to meet timing at the DFE receiver. In this way, the reset of the DFE tap of the disclosure may automatically track voltage-temperature (VT) variations in the memory apparatus.

DESCRIPTION OF THE EMBODIMENTS

Figure 1:
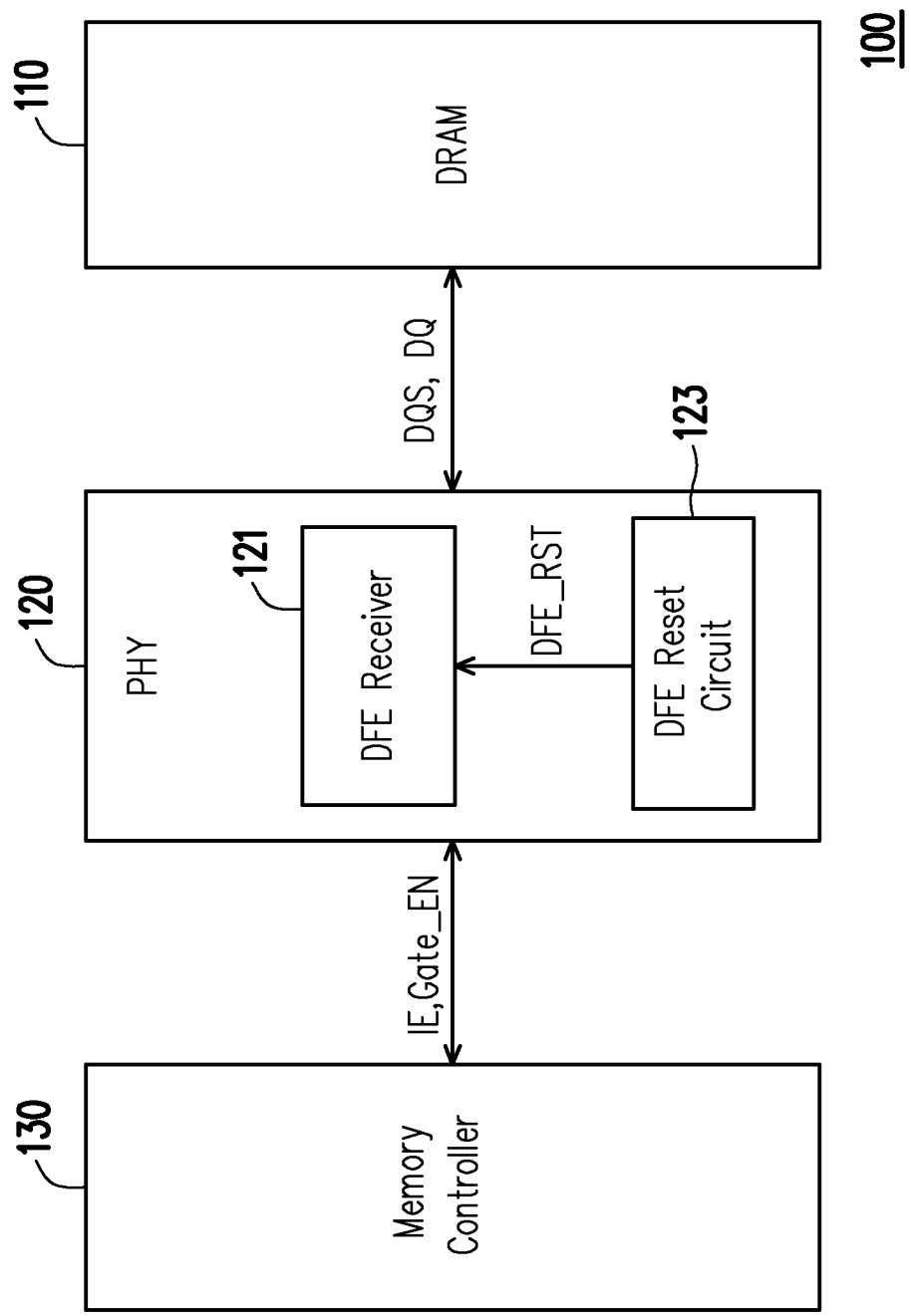
FIG. 1 illustrates a schematic diagram of a memory apparatus in accordance with some embodiments.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a schematic diagram of a memory apparatus 100 that includes a memory device 110, a memory physical layer interface (PHY) 120, a memory controller 130 in accordance with some embodiments. The memory device 110 may include a plurality of memory banks (not shown), and each memory bank may include a plurality of memory cells for storing data. The memory banks of the memory device 110 may be double data rate (DDR) memory banks. In an embodiment, the memory device 110 is a low-power double data rate (LPDDR) dynamic random-access memory (DRAM). The organization and sizes of the memory banks of the memory device 110 may vary based on applications and requirements of the memory apparatus 100.

The memory controller 130 may generate and supply various control commands or data to control operations of the memory apparatus 100. The memory controller 130 may include logic circuits used to control reading data from the memory device 110 and writing data to the memory device 110. The memory controller 130 may control operations of the memory device 110 using commands transmitted to the memory device 110 via the PHY 120. In some embodiments, the memory controller 130 provide an internal enable signal IE and a gate enable signal Gate_EN to the PHY 120 to control operations of the PHY 120 and the memory device 110. The gate enable signal Gate_EN and the internal enable signal IE may be used to generate a decision feedback equalization (DFE) reset signal DFE_RST for resetting a DFE tap of a DFE receiver. The configuration and structure of the memory controller 130 are not limited in the disclosure, and may vary according to applications of the memory apparatus 100.

The PHY 120 is coupled between the memory device 110 and the memory controller 130 via different interfaces. For example, the PHY 120 may communicate with the memory device 110 via a DRAM interface (not shown), and the PHY 120 may communicate with the memory controller 130 via a DFI (DDR PHY Interface) interface (not shown). The PHY 120 may include a DFE receiver 121 and a DFE reset circuit 123. The DFE receiver 121 is configured to receive data and clock information from the memory device 110. For example, the DFE receiver 121 may receive data signal DQ and data strobe signal DQS from the memory device 110.

In some embodiments, the DFE receiver 121 may include a number of DFE taps (not shown) which are also known as feedback taps of the DFE receiver 121. Values of the DFE taps of the DFE receiver 121 may depend on data signals (or data bits) that are previously received or sampled by the DFE receiver 121. In an embodiment, the DFE receiver 121 is 1-tap DFE receiver that includes one DFE tap whose value depends on a previously sampled data bit of the data signal DQ. The DFE receiver 121 may adjust the current data signal DQ based on the value of the DFE tap. For example, when the value of the DFE tap (i.e., previously sampled data bit) is "1", DFE receiver 121 may subtract a specific signal (i.e., −ve signal) from the current data signal DQ; and when the value of the DFE tap (i.e., previously sampled data bit) is "0", DFE receiver 121 may add the specific signal (i.e., +ve signal) to the current data signal DQ. The DFE tap should be reset before each read burst is performed to read the data signals from the memory device 110. When multiple read bursts are performed, the DFE tap of the DFE receiver 121 should be reset between the read bursts.

The DFE reset circuit 123 is electrically connected to the DFE receiver 121 and is configured to generate and output a DFE reset signal to the DFE receiver 121 to reset the DFE tap of the DFE receiver 121. In some embodiments, the DFE reset circuit 123 may receive the internal enable signal IE and the gate enable signal Gate_EN from the memory controller 130, and the DFE reset circuit 123 is configured to generate the DFE reset signal according to the received internal enable signal IE and the received gate enable signal Gate_EN. The disclosure does not intend to limit the circuit structures of the DFE receiver 121 and the DFE reset circuit 123 to any specific circuit structures. The designs of the DFE receiver 121 and the DFE reset circuit 123 may vary according to different requirements of the memory apparatus 100.

Figure 2:
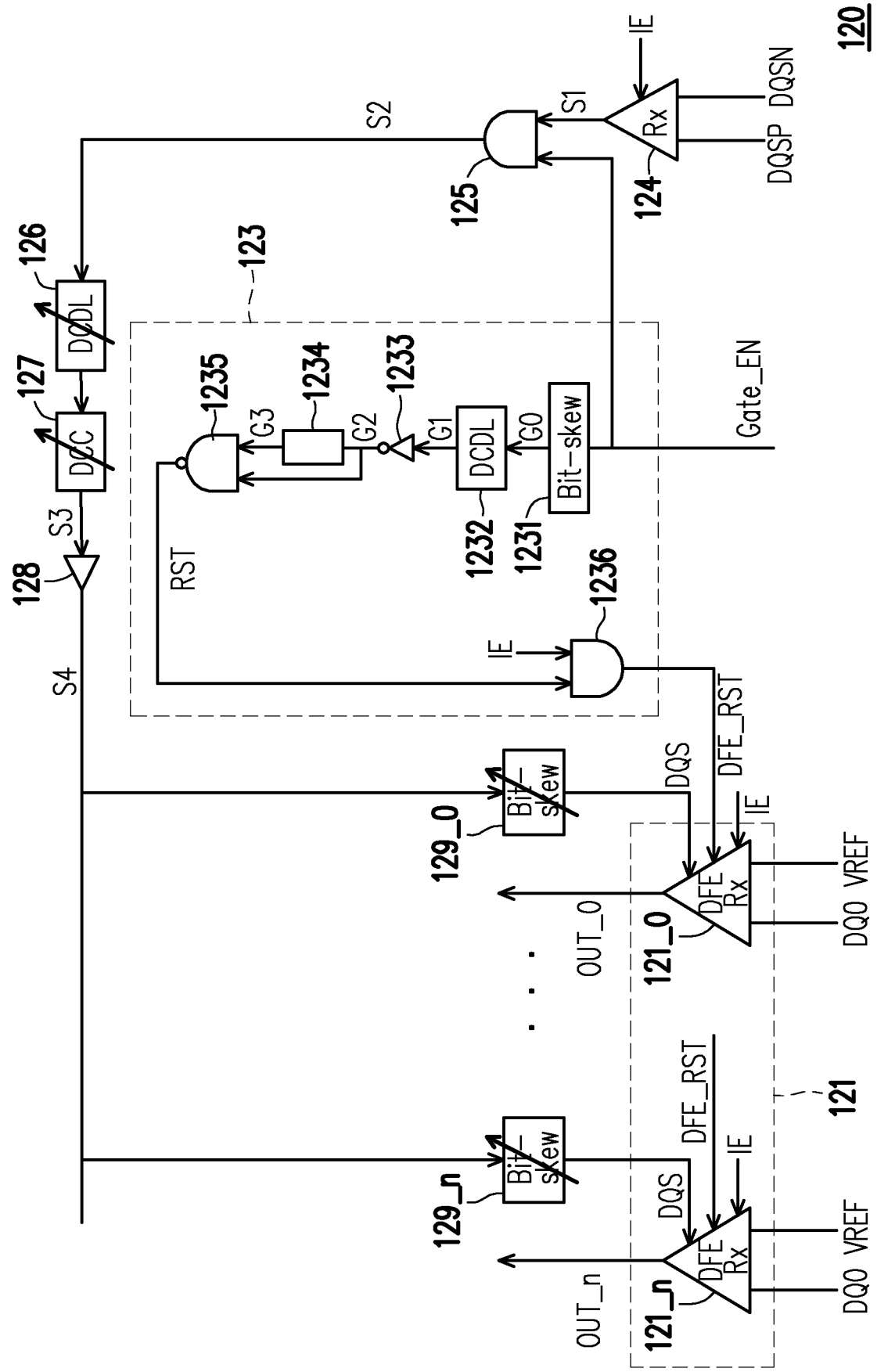
FIG. 2 illustrates a schematic diagram of memory physical layer interface of a memory apparatus in accordance with some embodiments.

FIG. 2 illustrates a schematic diagram of a memory physical layer interface (PHY) of a memory apparatus in accordance with some embodiments. The PHY of the memory apparatus may be the PHY 120 of the memory apparatus 100 as shown in FIG. 1. The DFE reset circuit 123 of the PHY 120 is configured to generate a DFE reset signal DFE_RST based on the gate enable signal Gate_EN and the internal enable signal IE. The DFE reset circuit 123 may include delay elements 1231, 1234, a digitally controlled delay line (DCDL) 1232, an inverter 1233 and logic circuits 1235 and 1236. The delay element 1231 may receive the gate enable signal Gate_EN and is configured to delay the gate enable signal Gate_EN by a certain delay amount to generate a signal G0. The DCDL 1232 is connected to the delay element 1231 and is configured to delay the signal G0 by a delay amount to generate a first signal G1. The delay amount of the DCDL 1232 may be digitally controlled by a control signal (not shown). The inverter 1233 is coupled to the DCDL 1232 to receive the first signal G1, and is configured to invert the first signal G1 to generate a second signal G2. An inclusion of the DCDL 1232 in the PHY 120 is optional; and in an embodiment, the PHY 120 does not include the DCDL 1232. In this embodiment, the delay element 1231 may be coupled to the inverter 1233 and the delay element 1231 may provide the first signal G1 to the inverter 1233. The delay element 1234 is coupled to the inverter 1233 and is configured to delay the second signal G2 by a certain delay amount to generate a third signal G3. The logic circuit 1235 is coupled to the inverter 1233 and the delay element 1234 to receive the second signal G2 and the third signal G3 as inputs of the logic circuit 1235. The logic circuit 1235 is configured to perform a logic operation (i.e., NAND operation) on the second signal G2 and the third signal G3 to generate a reset signal RST. The logic circuit 1236 is configured to receive the reset signal RST and the internal enable signal IE as inputs of the logic circuit 1236. The logic circuit 1236 is configured to perform a logic operation (i.e., AND operation) on the reset signal RST and the internal enable signal IE to generate a DFE reset signal DFE_RST. In some embodiments, the logic circuit 1235 is a NAND gate, and the logic circuit 1236 is an AND gate, but the disclosure is not limited thereto. The DFE reset circuit 123 may output the DFE reset signal DFE_RST to the DFE receiver 121 of the PHY 120.

The DFE receiver 121 may include a plurality of receiving circuits 121_0 through 121_n which are configured to receive data signals (or data bits) DQ0 through DQn and a reference voltage VREF. Each of the receiving circuits 121_0 through 121_n is configured to compare the reference voltage VREF with respective received data signal to generate a respective a digital output signal OUT_0 through OUT_n. For example, the receiving circuit 121_0 may compare the reference voltage VREF with the received data signal DQ0 to generate the digital output signal OUT_0; and the receiving circuit 121_n may compare the reference voltage VREF with the received data signal DQn to generate the digital output signal OUT_n. The DFE receiver 121 may further receive the data strobe signal DQS that provides timing information for the receiving circuits 121_0 through 121_n to generate and output the digital output signals OUT_0 through OUT_n.

In some embodiments, the receiving circuits 121_0 through 121_n of the DFE receiver 121 may further receive the DFE reset signal DFE_RST and the internal enable signal IE. The DFE receiver 121 may reset the DFE tap of the DFE receiver 121 based on the DFE reset signal DFE_RST and the internal enable signal IE. The receiving circuits 121_0 through 121_n may receive the DFE reset signal DFE_RST from the DFE reset circuit 123, and the receiving circuits 121_0 through 121_n may receive the internal enable signal IE from the memory controller (i.e., memory controller 130 in FIG. 1). The DFE reset signal DFE_RST may be input to the DFE receiver 121 to reset the DFE tap before each read burst is performed. If multiple read bursts are performed, the DFE reset signal DFE_RST may be input tap in a gap interval between the read bursts to reset the DFE.

In some embodiments, the PHY 120 further includes a DQS receiver 124, a logic circuit 125, DCDLs 126, 127, a buffer 128 and delay elements 129_0 through 129_n. The DQS receiver 124 is configured to receive the internal enable signal IE and a DQS pair DQSP and DQSN. The DQS receiver 124 is configured to generate a signal S1 based on the internal enable signal IE and the DQS pair DQSP and DQSN. The logic circuit 125 receives the signal S1 and the gate enable signal Gate_EN, and is configured to perform a logic operation on the signals S1 and the gate enable signal Gate_EN to generate a signal S2. The logic circuit 125 may be an AND gate, and the logic operation performed by the logic circuit 125 may be the AND operation, but the disclosure is not limited thereto. The DCDL 126 and DCC (Duty-cycle corrector) 127 are configured to delay the signal S2 by controllable delay amount to generate a delay signal S3; and the buffer 128 is configured to generate the signal S4 based on the delay signal S3 generated by the DCC 127. Each of the delay elements 129_0 through 129_n is connected to one of the receiving circuits 121_0 through 121_n of the DFE receiver 121. Each of the delay elements 129_0 through 129_n is configured to delay the signal S4 by a certain delay amount to generate the signal DQS. The delay elements 129_0 through 129_n provide the generated signal DQS to the receiving circuits 121_0 through 121_n of the DFE receiver 121.

Figure 3:
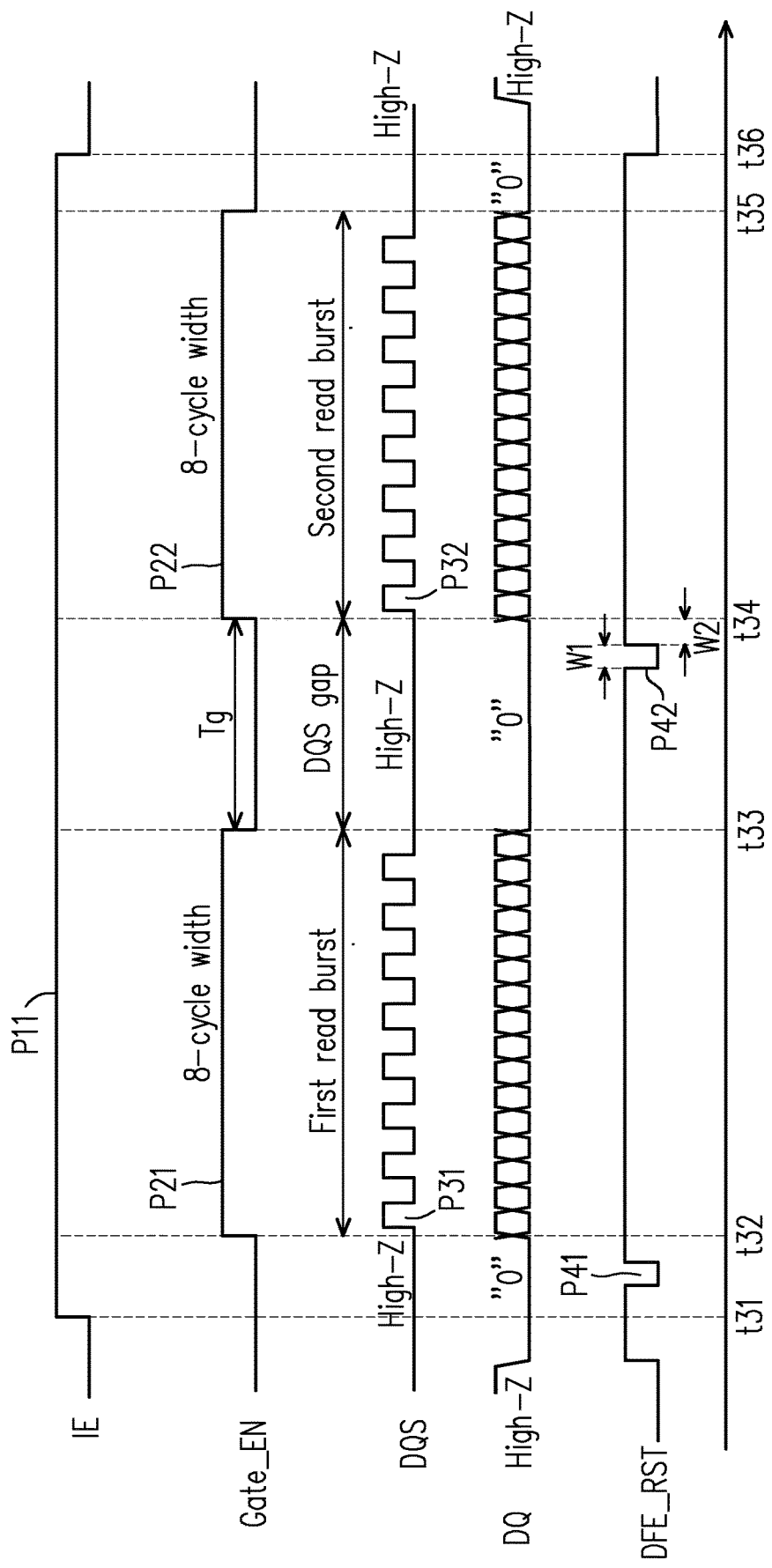
FIG. 3 illustrates a timing diagram of signals in a memory physical layer interface of a memory apparatus in accordance with some embodiments.

FIG. 3 illustrates a timing diagram of the internal enable signal IE, the gate enable signal Gate_EN, the data strobe signal DQS signal and the data signal DQ in a PHY (i.e., PHY 120 in FIG. 1) in accordance with some embodiments. The internal enable signal IE may include a pulse P11 which rises at t31 and falls at t36. In other words, the internal enable signal IE is at a high logic state during a time interval from t31 to t36. The internal enable signal IE may be provided by the memory controller (i.e., memory controller 130 in FIG. 1), and a pulse width of the pulse P11 may be determined by the memory controller. The gate enable signal Gate_EN may include pulses P21 and P22 being separated by a gap period Tg. The pulse P21 rises at t32 and falls at t33, and the pulse P22 rises at t34 and falls at t35. In some embodiments, a pulse width of each of the pulses P21 and P22 of the gate enable signal Gate_EN may correspond to a length of a number of system clock cycles of a system clock signal (not shown). For example, the pulse width of each of the pulses P21 and P22 may correspond to a length of 8 system clock cycles, but the disclosure is not limited thereto. The gap period Tg may correspond to a length of 4 system clock cycles, but the disclosure is not limited thereto.

The data strobe signal DQS may include a plurality of pulses P31 and a plurality of pulses P32 being separated by a DQS gap. The pulses P31 are generated during a first read burst, and the pulses P32 are generated during a second read burst. The DQS gap may correspond to a gap between the first and second read burst, and the data strobe signal DQS is in an unknown logic state high-Z. The first read burst and the second read burst may be two consecutive read bursts, in which the second read burst is performed after the first read burst. In an embodiment, the time interval of the first read burst and the time interval of the second read burst may align with the pulses P21 and P22 of the gate enable signal Gate_EN. In an embodiment, the data strobe signal DQS includes 8 pulses P31 and 8 pulses P32 corresponding to 8 system clock cycles, and the DQS gap includes 4 system clock cycles. It should be noted that the number of pulses P31 and P32 and a length of the DQS gap may vary in different applications of the memory apparatus.

The data signal DQ may carry output data that are transmitted in synchronization with the pulses of the data strobe signal DQS during the read bursts. The data signal DQ may be in a low logic state (logic state of "0") or unknown logic state high-Z outside the read bursts.

The DFE reset signal DFE_RST may include pulse P41 and P42 that are configured to reset the DFE tap included in a DFE receiver (i.e., DFE receiver 121 in FIG. 1 and FIG. 2). The pulse P41 is input to the DFE receiver to reset the DFE tap of the DFE receiver before the first read burst is performed, and the pulse P42 is input to the DFE receiver to reset the DFE tap of the DFE receiver before the second read burst is performed. The pulse P42 of the DFE reset signal DFE_RST may be input to the DFE receiver during the DQS gap of the data strobe signal DQS. In some embodiments, a pulse width W1 of the pulses 41 and 42 can be designed based on requirements of the DFE receiver 121. In addition, a margin W2 from the pulse 42 of the DFE reset signal DFE_RST to a start of the second read burst may be determined based on simulations across worst corners. In an embodiment, the memory controller (i.e., memory controller 130 in FIG. 1) may perform a read training to determine appropriate values of the margin W2. In addition, the pulses of the DFE reset signal DFE_RST may be designed with respect to the incoming DQS/DQ signals without disturbing the actual output data.

Referring to FIG. 3, in a case where the DQS gap between two read bursts is short, the internal enable signal IE may not be turned off during the DQS gap. Based on the internal enable signal IE turn-on time and a margin between turn-on and actual incoming data, the internal enable signal IE may not be turned off even for multiple cycle gap (i.e., 2-cycle, 3-cycle, 4-cycle or 5-cycle gap) between read bursts. For example, in a LPDDR applications, a command clock and data strobe signal DQS may operate at a 4:1 ratio. In such a case, for 1-cycle command-gap between read bursts may lead to 4-cycle DQS gap between read bursts. Even this 4-cycle DQS gap may not be sufficient to turn off the internal enable signal IE.

In some embodiments of the disclosure, the DFE reset signal DFE_RST is generated based on both the internal enable signal IE and the gate enable signal Gate_EN, the DFE reset signal DFE_RST may be generated to reset the DFE tap of the DFE receiver even when the internal enable signal IE is not turned off (i.e., when the internal enable signal IE is switched from the high-logic state to the low logic-state). In other words, even if a gap between read bursts is short or varied (i.e., 1 cycle, 2 cycle, 3 cycle gaps) due to different frequencies, the DFE tap of the DFE receiver can be reset between the read bursts. In addition, the memory apparatus may include an AND gate that receives the gate enable signal Gate_EN and the data strobe signal (i.e., DQS pair), and the memory apparatus 100 may route the DFE reset signal with similar delay of the data strobe signal to meet the timing at the DFE receiver 121. In this way, the mechanism to reset DFE tap can automatically track VT variations.

Figure 4:
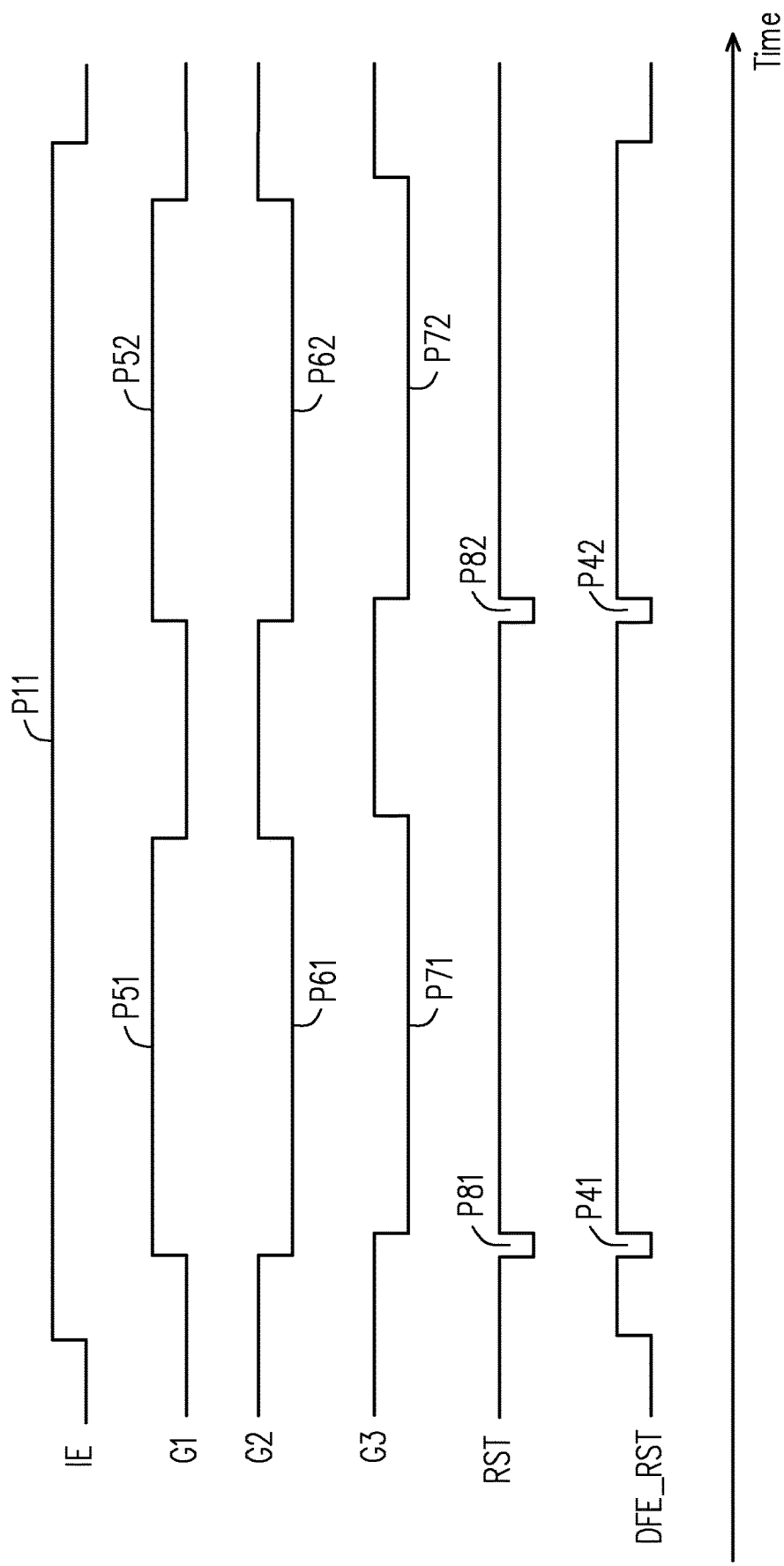
FIG. 4 illustrates a waveform diagram of signals in a DFE reset circuit of a memory apparatus in accordance with some embodiments.

FIG. 4 illustrates a timing diagram of the internal enable signal IE, the first to third signals G1 to G3, the reset signal RST and the DFE reset signal DFE_RST in a DFE reset circuit (i.e., DFE reset circuit 123) in accordance with some embodiments. The internal enable signal IE as shown in FIG. 4 is same as the internal enable signal IE in FIG. 3, thus the detailed description of the internal enable signal IE is omitted hereafter.

The first signal G1 may include pulses P51 and P52 which are delayed pulses of the pulses P21 and P22 of the gate enable signal Gate_EN. As shown in FIG. 2 and FIG. 4, the first signal G1 is generated by delaying the gate enable signal Gate_EN using the delay element 1231 and the DCDL 1232. The delay amount of the first signal G1 compared to the gate enable signal Gate_EN may vary based on different applications of the memory apparatus.

The second signal G2 may include pulses P61 and P62 which are inverted pulses of the pulses P51 and P52 of the first signal G1. As shown in FIG. 2 and FIG. 4, the second signal G2 is generated by inverting the first signal G1 using the inverter 1233.

The third signal G3 may include pulses P71 and P72 which are delayed pulses of the pulses P61 and P62 of the second signal G2. As shown in FIG. 2 and FIG. 4, the third signal G3 is generated by delaying the second signal G2 using the delay element 1234. The delay amount of the third signal G3 compared to the second signal G2 may vary based on different applications of the memory apparatus.

The reset signal RST include pulses P81 and P82 which are obtained by performing a logic operation (i.e, NAND operation) on the third signal G3 and the second signal G2. As shown in FIG. 2 and FIG. 4, the reset signal RST is generated by performing a NAND operation on the second signal G2 and the third signal G3 using the logic circuit 1235.

The DFE reset signal DFE_RST include pulses P41 and P42 which are obtained by performing a logic operation (i.e, AND operation) on the reset signal RST and the internal enable signal IE. As shown in FIG. 2 and FIG. 4, the DFE reset signal DFE_RST is generated by performing the AND operation on the reset signal RST and the internal enable signal IE using the logic circuit 1236. The DFE reset signal DFE_RST that is generated by the DFE reset circuit 123 is provided to the DFE receiver 121 to reset the DFE tap of the DFE receiver 121.

Figure 5:
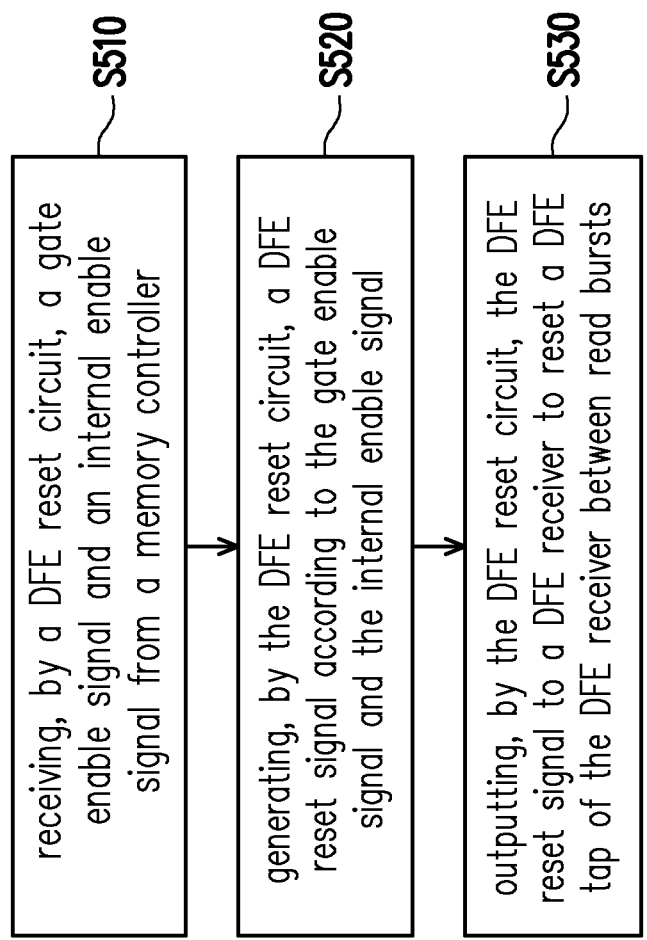
FIG. 5 illustrates flowchart diagram of a method of a memory apparatus in accordance with some embodiments.

FIG. 5 illustrates a flowchart diagram of a method of a memory apparatus in accordance with some embodiments. The memory apparatus may include a memory device, a memory controller and a memory physical layer interface, the memory physical layer interface comprising a decision feedback equalization (DFE) reset circuit and a DFE receiver. In step S510, the method receives, by a DFE reset circuit, a gate enable signal and an internal enable signal from a memory controller. In step S520, the method generates, by the DFE reset circuit, a DFE reset signal according to the gate enable signal and the internal enable signal. In step S530, the method outputs, by the DFE reset circuit, the DFE reset signal to a DFE receiver to reset a DFE tap of the DFE receiver before performing a read burst. In this way, the method of the memory apparatus may generate the DFE reset signal to effectively reset the DFE tap of the DFE receiver before performing the read burst.

In summary, a DFE reset circuit may generate the DFE reset signal based on both the gate enable signal and the internal enable signal, and the DFE reset circuit may provide the generated DFE reset signal to reset a DFE tap of the DFE receiver between two different read bursts. In this way, the DFE tap of the DFE receiver may be reset between read bursts across all frequencies. Furthermore, a DFE tap reset mechanism of the disclosure may automatically track the voltage-temperature (VT) variations by using AND gate that receives the gate enable signal and the data strobe signal and by routing the DFE reset signal with similar delay of the gate enable signal to meet the timing of the DFE receiver.

Although the embodiment of the disclosure has been described in detail, the disclosure is not limited to a specific embodiment and various modifications and changes are possible within the scope of the disclosure disclosed in the claims.

What is claimed is:

1. A memory apparatus, comprising:
   a memory device;
   a memory controller; and
   a memory physical layer interface, coupled between the memory device and the memory controller, the memory physical layer interface comprises:
      a decision feedback equalization (DFE) receiver, receiving a data signal and a data strobe signal from the memory device, wherein the DFE receiver comprises a DFE tap that is determined according to a previous data signal, and the DFE receiver adjusts the data signal according to the DFE tap; and
      a DFE reset circuit, receiving a gate enable signal and an internal enable signal from the memory controller, generating a DFE reset signal according to the gate enable signal and the internal enable signal, and outputting the DFE reset signal to the DFE receiver to reset the DFE tap of the DFE receiver between read bursts.

2. The memory apparatus of claim 1, wherein the DFE reset circuit comprises:
   an inverter, receiving a first signal and inverting the first signal to generate a second signal, wherein the first signal is generated according to the gate enable signal;
   a first logic circuit, performing a first logic operation on the second signal and a third signal to generate a reset signal, wherein the third signal is a delayed signal of second signal; and
   a second logic circuit, performing a second logic operation on the reset signal and the internal enable signal to generate a DFE reset signal.

3. The memory apparatus of claim 2, wherein
   the first logic circuit is a NAND gate, and the second logic circuit is an AND gate.

4. The memory apparatus of claim 1, wherein the DFE reset circuit further comprises:
   a first delay circuit, delaying the gate enable signal to generate the first signal; and
   a second delay circuit, coupled between the inverter and the first logic circuit, delaying the second signal to generate the third signal.

5. The memory apparatus of claim 1, wherein
   the read bursts comprise a first read burst and a second read burst, and
   the DFE reset circuit is configured to reset the DFE tap before performing each of the first read burst and the second read burst.

6. The memory apparatus of claim 5, wherein
   the first read burst and the second read burst are separated by a gap interval,
   the DFE reset signal comprises a plurality of reset pulses, and one of the reset pulses is asserted in the gap interval.

7. The memory apparatus of claim 5, wherein
   first read burst is performed during a first read period, the second read burst is performed during a second read period,
   the gate enable signal comprises a first pulse and a second pulse, a pulse width of the first pulse of the gate enable signal overlaps the first read period of the first read burst, and a pulse width of the second pulse of the gate enable signal overlaps the second read period of the second read burst.

8. The memory apparatus of claim 1, wherein the memory physical layer interface further comprises:
- a data strobe signal receiver, receiving a data strobe pair from the memory device;
- a third logic circuit, performing a third logic operation on an output of the data strobe signal receiver and the gate enable signal;
- a third delay circuit, delaying an output of the third logic circuit to generate the data strobe signal.

9. A memory physical layer interface, comprising:
- a decision feedback equalization (DFE) receiver, receiving a data signal and a data strobe signal, wherein the DFE receiver comprises a DFE tap that is determined according to a previous data signal, and the DFE receiver adjusts the data signal according to the DFE tap; and
- a DFE reset circuit, receiving a gate enable signal and an internal enable signal, generating a DFE reset signal according to the gate enable signal and the internal enable signal, and outputting the DFE reset signal to the DFE receiver to reset the DFE tap of the DFE receiver between read bursts.

10. The memory physical layer interface of claim 9, wherein the DFE reset circuit comprises:
- an inverter, receiving a first signal and inverting the first signal to generate a second signal, wherein the first signal is generated according to the gate enable signal;
- a first logic circuit, performing a first logic operation on the second signal and a third signal to generate a reset signal, wherein the third signal is a delayed signal of second signal;
- a second logic circuit, performing a second logic operation on the reset signal and the internal enable signal to generate a DFE reset signal.

11. The memory physical layer interface of claim 9, wherein the DFE reset circuit comprises:
- a first delay circuit, delaying the gate enable signal to generate the first signal; and
- a second delay circuit, coupled between the inverter and the first logic circuit, delaying the second signal to generate the third signal.

12. The memory physical layer interface of claim 9, wherein
- the read bursts comprise a first read burst and a second read burst, and
- the DFE reset circuit is configured to reset the DFE tap before performing each of the first read burst and the second read burst.

13. The memory physical layer interface of claim 12, wherein
- the read bursts comprise a first read burst and a second read burst, the first read burst and the second read burst are separated by a gap interval,
- the DFE reset circuit is configured to reset the DFE tap before performing each of the first read burst and the second read burst,
- the DFE reset signal comprises a plurality of reset pulses, and one of the reset pulses is asserted in the gap interval,
- first read burst is performed during a first read period, the second read burst is performed during a second read period,
- the gate enable signal comprises a first pulse and a second pulse, a pulse width of the first pulse of the gate enable signal overlaps the first read period of the first read burst, and a pulse width of the second pulse of the gate signal overlaps the second read period of the second read burst.

14. The memory physical layer interface of claim 1, further comprising:
- a data strobe signal receiver, receiving a data strobe pair from the memory device;
- a third logic circuit, performing a third logic operation on an output of the data strobe signal receiver and the gate enable signal;
- a third delay circuit, delaying an output of the third logic circuit to generate the data strobe signal.

15. A method of a memory apparatus comprising a memory device, a memory controller and a memory physical layer interface, the memory physical layer interface comprising a decision feedback equalization (DFE) reset circuit and a DFE receiver, the method comprising:
- receiving, by the DFE reset circuit, a gate enable signal and an internal enable signal from the memory controller;
- generating, by the DFE reset circuit, a DFE reset signal according to the gate enable signal and the internal enable signal; and
- outputting, the DFE reset signal, to the DFE receiver to reset a DFE tap of the DFE receiver between read bursts.

16. The method of claim 15, wherein generating the DFE reset signal comprising:
- receiving a first signal and inverting the first signal to generate a second signal, wherein the first signal is generated according to the gate enable signal;
- performing a first logic operation on the second signal and a third signal to generate a reset signal, wherein the third signal is a delayed signal of second signal; and
- performing a second logic operation on the reset signal and the internal enable signal to generate a DFE reset signal.

17. The memory apparatus of claim 16, wherein
the first logic circuit is a NAND gate and the second logic circuit is a AND gate.

18. The method of claim 15, further comprising:
delaying the gate enable signal to generate the first signal; and
delaying the second signal to generate the third signal.

19. The method of claim 15, wherein
- the read bursts comprise a first read burst and a second read burst, the first read burst and the second read burst are separated by a gap interval,
- the DFE tap is reset before performing each of the first read burst and the second read burst,
- the DFE reset signal comprises a plurality of reset pulses, and one of the reset pulses is asserted in the gap interval,
- first read burst is performed during a first read period, the second read burst is performed during a second read period,
- the gate enable signal comprises a first pulse and a second pulse, a pulse width of the first pulse of the gate enable signal overlaps the first read period of the first read burst, and a pulse width of the second pulse of the gate signal overlaps the second read period of the second read burst.

20. The method of claim 15, further comprising:
receiving a data strobe pair from the memory device;
performing a third logic operation on an output of the data strobe signal receiver and the gate enable signal; and delaying an output of the third logic circuit to generate the data strobe signal.

\* \* \* \* \*